United States Patent [19]
Hösel

[11] Patent Number: 4,512,704
[45] Date of Patent: Apr. 23, 1985

[54] ARRANGEMENT FOR UNLOADING AND LOADING X-RAY FILM CASSETTES

[75] Inventor: Peter Hösel, Munich, Fed. Rep. of Germany

[73] Assignee: Agfa-Gevaert AG, Leverkusen, Fed. Rep. of Germany

[21] Appl. No.: 384,162

[22] Filed: Jun. 1, 1982

[30] Foreign Application Priority Data

Jun. 6, 1981 [DE] Fed. Rep. of Germany ....... 3122581

[51] Int. Cl.³ ............................................. B65G 43/08
[52] U.S. Cl. .................... 414/292; 198/857; 414/294
[58] Field of Search ............... 414/159, 287, 288, 292, 414/294, 298, 323, 403, 411; 198/781, 857, 469, 470, 783; 242/195

[56] References Cited

U.S. PATENT DOCUMENTS

| | | | |
|---|---|---|---|
| 1,560,830 | 11/1925 | Langsdorf | 198/469 X |
| 3,718,248 | 2/1973 | Muller | 198/857 X |
| 4,049,142 | 9/1977 | Azzaroni | 414/403 X |

Primary Examiner—Robert G. Sheridan
Attorney, Agent, or Firm—Michael J. Striker

[57] ABSTRACT

An arrangement for loading and unloading X-ray film cassettes is provided with a channel bounded by bottom, top and lateral walls. At one of its ends, the channel has an inlet opening for the cassettes, while it is provided with an abutment wall at its other end. A plurality of transporting rollers is accommodated in respective slots of the bottom wall, each of the transporting rollers slightly projecting above the bottom wall to engage and entrain the respective cassette resting thereon. A switching roller is situated in a recess of the bottom wall between the inlet opening and the first of the transporting rollers. The switching roller is supported on springs so that, when the cassette rests thereon, it is depressed into the recess, so that the respective spring activates an associated light barrier that issues a control signal. The control signal is used for energizing the drive for the transporting rollers, if de-energized, and for de-energizing the drive, if energized. A microswitch in the abutment wall de-energizes the drive when depressed by the cassette. A switching element sensitive to re-closing of the cassette re-energizes the drive, but in the opposite direction. A closing slide is used for light-tightly closing and for opening the inlet opening in cycle with the movement of the cassette.

10 Claims, 2 Drawing Figures

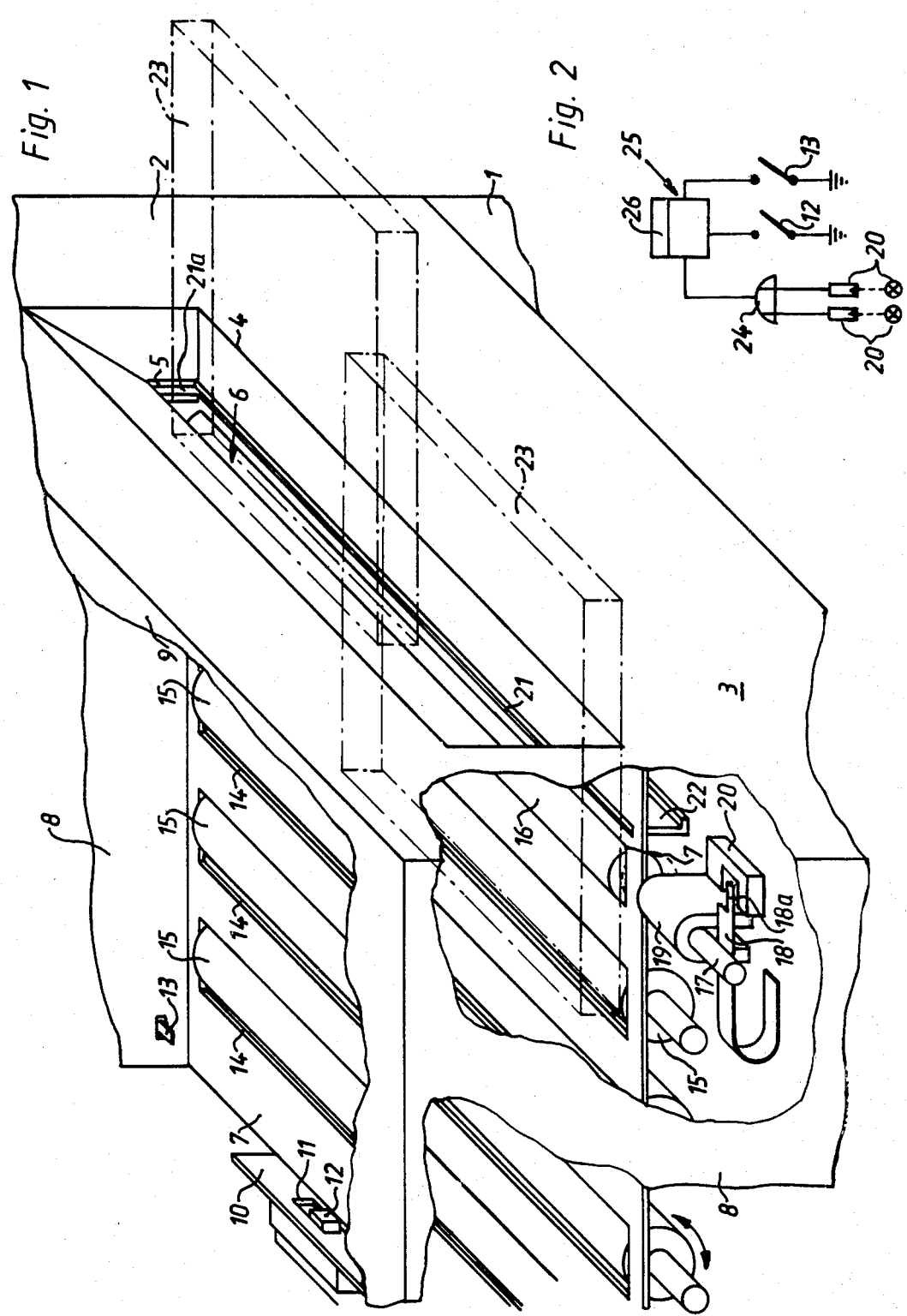

ARRANGEMENT FOR UNLOADING AND LOADING X-RAY FILM CASSETTES

BACKGROUND OF THE INVENTION

The present invention relates to arrangements for handling cassettes in general, and more particularly to an arrangement for loading and unloading X-ray film cassettes.

There is already known, from the German published patent application DE-OS No. 26 07 876 an arrangement for unloading and loading X-ray film cassettes, which includes a channel for the accommodation of the respective X-ray film cassette, transporting elements for displacing the cassette into and out of the channel, a closure for a light-impervious closing of the inlet opening of the channel, an arrangement for opening the respective cassette while in the channel and while the closure is closed, and an arrangement for removing X-ray films from the cassettes and introducing different X-ray films into the cassettes. In this construction, the transporting elements are constituted by endless conveyor belts or bands, which move the respective cassette all the way into the channel, until the cassette abuts an abutment in which there is provided a microswitch which terminates the operation of the drive of the transporting elements. A pair of rubber rollers is arranged at the inlet opening. These rubber rollers, on the one hand, receive the respective cassette between themselves and guide the same toward the transporting elements and, on the other hand, cooperate with two additional rollers to constitute the light-impervious or light-tight closure for the inlet opening and thus for the channel. These four entrance rollers are relatively expensive. Moreover, and possibly more importantly, the rubber rollers must be frequently replaced, since a deformation of their peripheral surfaces due to the contact with the cassettes, which have substantial dimensions and particularly thicknesses, occurs after a relatively short period of use. Once this damage or deformation occurs, the light-tight closing action of the closure cannot be assured any longer. An additional disadvantage which was found to exist in this conventional construction and which is also of a considerable importance is that, during the discharge of the cassette from the channel following the termination of the loading and unloading operation, the cassette has to be held between the rubber rollers for a considerable period of time when a depositing table arranged externally at the inlet opening of the arrangement has a short length, which results in a further deformation of the rubber rollers, or, should it be preferred that the cassette be fully discharged from the channel and deposited on the depositing table, the latter must be so dimensioned as to be able to support the cassette having the largest dimensions. It is well known that the X-ray film cassettes have dimensions which vary from one another in a wide range, depending on the dimensions of the X-ray films which, in turn, depend on the dimensions of the body part to be X-rayed and the construction of the X-ray machine. Thus, the relatively expensive large-dimension depositing table will be underutilized most of the time, and the arrangement with the table will occupy more space than necessary.

SUMMARY OF THE INVENTION

Accordingly, it is an object of the present invention to avoid the disadvantages of the prior art.

More particularly, it is an object of the invention to provide an arrangement for handling, especially unloading and loading, cassettes, particularly X-ray cassettes, which does not possess the disadvantages of the conventional arrangements of this type.

Still another object of the present invention is so to construct the arrangement of the type here under consideration as to minimize the possibility of damage thereto and malfunction thereof due to such damage.

It is yet another object of the present invention to so design the arrangement of the above type as to improve the movement of the respective cassette therethrough.

A concomitant object of the invention is to develop an arrangement for unloading and loading X-ray film cassettes which is simple in construction, inexpensive to manufacture, easy to use, and reliable in operation nevertheless.

An additional object of the invention is to devise a cassette handling arrangement which does not require the provision of a large-dimensioned depositing table.

In pursuance of these objects and others which will become apparent hereafter, one feature of the present invention resides, in an arrangement for handling, especially unloading and loading, cassettes, particularly X-ray film cassettes, in a combination which comprises means for defining a channel for receiving the respective cassette, the channel having an inlet opening extending along a plane; means for transporting the respective cassette along the plane and through the inlet opening into and out of the channel, the transporting means including a plurality of transporting elements, such as transporting rollers, situated in the channel, and means for driving the transporting elements; means for light-tighly closing the inlet opening at least when the respective cassette is fully received in the channel; and means for controlling the operation of the driving means, including a switching roller extending substantially parallel to the plane substantially over the entire width of the inlet opening as considered in the plane and mounted for movement between an extended position assumed when the channel is empty, and a retracted position assumed when the respective cassette is at least partially received in the channel, and means for switching the driving means between a deenergized and an energized state thereof in response to movement of the switching roller from the extended to the retracted position thereof.

A particular advantage of the above-discussed construction of the arrangement according to the present invention is that the cassette always extends to the same distance out of the input opening after the conclusion of the handling operation and at the end of the discharging operation performed by the transporting elements, regardless of its dimensions. As a result of this it is no longer necessary to provide any depositing table.

It is particularly advantageous when the light-tightly closing means includes a slide mounted at the inlet opening for movement across the latter. In this manner, it is possible to dispense with the conventionally used light-tight closure including the rubber rollers and the counter rollers cooperating with the same, so that the damage to such non-existent rollers cannot occur. Moreover, the slide can be, and usually is, moved so far away from the trajectory of movement of the cassette through the inlet opening that no damage can possibly occur thereto.

According to an especially advantageous facet of the present invention, the controlling means further includes spring elements supporting the switching roller, particularly at its ends, and urging the roller towards its extended position, the spring elements cooperating with the switching means to achieve the switching of the driving means. In this context, it is particularly advantageous when the switching means includes at least one light barrier, and when the spring elements, or at least one of them, activate the light barrier in the retracted position of the switching roller.

A further advantageous feature of the present invention resides in the fact that the defining means includes an abutment at that end of the channel which is remote from the inlet opening, and that the controlling means further includes a switch connected to the driving means and operative for de-energizing the latter after being operated by the respective cassette approaching the abutment. The controlling means may further advantageously include a switching element responsive to the closing of the respective cassette after the termination of the handling operation, the switching element being connected to the driving means and operative for energizing the same for operation in the discharging direction.

Advantageously, the controlling means includes means for reversing the sense of operation of the transporting elements at the latest simultaneously with each energization of the driving means. It is further advantageous when the controlling means further includes delay means operative for relaying at least the de-energization of the driving means.

The novel features which are considered as characteristic of the invention are set forth in particular in the appended claims. The improved arrangement for handling X-ray film cassettes itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partially sectioned perspective view of an arrangement of the present invention for use in an apparatus for unloading and loading X-ray film cassettes; and FIG. 2 is a diagrammatic representation of a controlling circuitry for controlling the drive of the arrangement of FIG. 1.

DETAILED DESCRIPTION OF THE PREFERRED EMBODIMENTS

Referring now to the drawing in detail, and first to FIG. 1 thereof, it may be seen that the reference numeral 1 has been used to identify an apparatus for unloading and loading X-ray film cassettes, which is equipped with a handling station or arrangement 2. The handling arrangement 2 includes a front wall 3 which is provided with an aperture 4 from which inclined surfaces extend to an inlet opening 5. The dimensions of the inlet opening 5 are such that its height at least equals the height of the highest cassette, and its width at least equals the width of the widest cassette, to be handled by the arrangement 2 of the apparatus 1. A channel 6 extends from the inlet opening 5. The channel 6 is essentially bounded by a bottom wall 7, two lateral walls 8, and a top wall 9. The channel 6 is open at its rear end, that is, at its end which is remote from the inlet opening 5. The rear part of the channel 6 is delimited by an abutment wall 10 which is provided with a depression or recess 11, through which there extends an actuating button of a microswitch 12.

A plurality of elongated slots is formed in the bottom wall 7. A transporting roller 15, which can be driven in rotation, is partially accommodated in each of the slots and extends several millimeters above the plane of the upper surface of the bottom wall 7. The transporting rollers 15 are connected with a drive which has been omitted from the drawing, together with its transmission, since they are of conventional constructions.

A switching roller 16 is arranged between the inlet opening 5 and the first of the transporting rollers 15 as considered in direction from the inlet opening 5 to the abutment wall 10. The switching roller 16 is accommodated in a recess or slot 14 of the bottom wall 7. The switching roller 16 has, at each of its ends, a stub shaft 17 which rests on a spring element 18. A bracket 19 confines the respective stub shaft 17 for movement only in the direction toward the spring element 18, preventing the respective stub shaft 17 from moving in any other direction.

The spring element 18 has the shape of a bent leaf spring. Its one end is connected to the bottom wall 7 and its other end is provided with a lug 18a which, in the illustrated rest or extended position, is situated upwardly of a U-shaped recess of a light barrier 20. In the same manner, even the other end of the switching roller 16, or its stub shaft 17, is supported on its associated spring element 18 which also cooperates with a light barrier 20.

A further slot 21 is formed in the bottom wall 7 between the switching roller 16 and the input opening 5. A slide or closure 22 is received in the slot 21 for movement transversely of or across the inlet opening 5. The slide 22 is laterally guided in lateral grooves 21a and can be lifted out of its recessed position in which it is fully recessed into the slot 21 into its sealing position in which it extends across the inlet opening 5 and light-tightly closes the same. The movement of the slide 22 between its recessed and sealing positions is accomplished by conventional moving means which has also been omitted from the drawing in order not to unduly encumber the same.

In addition thereto, there is provided a switching element 13 at the rearward region of the channel 6. This switching element is so positioned and constructed, in a conventional manner, as to be able to detect the termination of the closing operation of the respective cassette after the handling operation, or loading and unloading operations, have been performed, and thus to initiate a control operation.

In order to simplify the drawing by eliminating therefrom all parts which are conventional and the illustration of which is not essential for understanding the present invention, the arrangement for opening the cassette prior to the loading and unloading operation, and the arrangement or arrangements for the unloading of the film from, and/or for the loading of the film into, the cassette, which are also situated in the channel 6, have been omitted from the drawing.

FIG. 2 illustrates the circuitry which interconnects the microswitch 12, the switching element 13, and the light barrier 20 with the drive of the transporting rollers 15. The reference numeral 24 identifies an OR-gate, the reference numeral 25 a control circuitry, and the reference numeral 26 a delay circuitry.

Having so discussed the construction of the arrangement of the present invention, its operation will now be discussed with reference to FIGS. 1 and 2.

The handling arrangement 2 of the apparatus 1 is ready for accepting a cassette when the slide or closure 22 is in its recessed position as illustrated in FIG. 1. At this time, the respective cassette of any of a variety of differently dimensioned cassettes, which is shown in FIG. 1 in phantom lines and which is identified by the reference numeral 23, can be introduced into the inlet opening 5. As soon as the cassette 23 touches the switching roller 16, one of the ends of the switching roller 16, that is, one of the stub shafts 17, is moved downwardly, depending on which side of the inlet slot 5 the cassette 23 passes through. As a result of this, the respectively associated spring element 18 is also pressed in the downward direction, so that its lug 18a crosses the light barrier 20. In this manner, at least one of the light barriers 20 issues a control signal which passes through the OR-gate 24 to the drive controlling circuitry 25. The latter includes logic circuitry of a simple design which has not been shown in detail since it can be easily derived from the description of the operation of the controlling circuitry 25. It ought to be mentioned, however, that this control signal so controls the drive, via the controlling circuitry 25 that, when the transporting rollers 15 are at standstill, that is, the drive is de-energized, the drive will be energized in response to this control signal, so that the transporting rollers 15 will be brought into rotation, in counterclockwise direction as considered in FIG. 1. In this manner, the transporting rollers 15 transport the respective cassette 23 into the channel 6. This movement continues until the leading end of the cassette 23 abuts the abutment wall 10. As the cassette 23 approaches the abutment wall 10 in the last phase of its inward movement, it depresses the button of the microswitch 12 which, in turn, de-energizes the drive of the transporting rollers 15. Thus, the cassette 23 reaches and remains in a position of abutment with the abutment wall 10.

At this time, the cassette 23 can be opened in a known manner, the film contained therein can be removed or unloaded, a new film can be introduced or loaded into the cassette 23, and the cassette 23 can be closed again. As the cassette 23 is being closed, especially once it has achieved its closed condition, the sensor or switching element 13 is actuated and supplies another control signal to the controlling circuitry 25. This last control signal re-energizes the drive for the transporting rollers 15; however, at this time, the drive rotates the transporting rollers in the opposite sense of rotation, that is, in the clockwise direction as considered in FIG. 1. As a result of this, the cassette 23 is moved by the transporting rollers 15 back toward and through the inlet opening 5.

As soon as the cassette 23 reaches the switching roller 16 on its way back toward the inlet opening 5 and presses the same in the downward direction, one or both of the light barriers 20 are activated in response to the movement of the switching roller 16 towards its retracted position, thus issuing at least one control signal which passes through the OR-gate 24 and reaches the controlling circuitry 25. At this time, the control signal from the light barrier 20 de-energizes the drive for the transporting rollers 15.

The control operation usually has a certain degree of inertia or delay, so that the cassette 23 is moved a certain distance toward and through the inlet opening 5 after the control operation has been initiated by the depression of the switching roller 16. Thus, when the movement of the cassette 23 ends, a portion of the cassette 23 sticks out of the inlet opening 5. However, should this inertia of the controlling operation be non-existent or insufficient, the controlling circuitry 25 may be provided with a delay circuitry 26. The delay circuitry 26 is then operative for introducing such a delay into the operation of the controlling circuitry 25 that the drive for the transporting rollers 15 is deenergized only after a predetermined time interval has passed from the depression of the switching roller 16. In both instances, it is achieved that the cassette 23 projects to a predetermined distance beyond the inlet opening 5, so that it can be easily gripped by hand. Moreover, the projection of the cassette 23 out of the inlet opening 5 gives the operating personnel a visual indication that the unloading and loading operation has been performed. The length of the projecting portion of the cassette 23 is independent on the dimensions of the respective cassette 23, inasmuch as the control operation is initiated by the then leading end of the cassette 23. In this manner, it is, for instance, no longer necessary to provide any depositing table for the cassette 23.

Advantageously, the movement of the slide 22 is coupled with the insertion and withdrawal of the cassette 23. So, for instance, the actuation of the microswitch 12 can be used to initiate the movement of the slide 22 into its sealing position, and the actuation of the switching element 13 may be used for triggering the return of the slide 22 into its recessed position. In both cases, the cassette 23 is still, or already, in its closed condition.

For reason of reducing weight, the switching roller 16 is advantageously constructed as a hollow shaft. In this manner, the response threshold for the spring element 18 is increased. In addition thereto, the spring force of the spring elements 18 is so selected that a response occurs when a part of the weight of the cassette 23 having the smallest acceptable weight rests on the switching roller 16. Finally, the spring forces of the two spring elements 18 should be as close to one another as possible.

It will be understood that each of the elements described above, or two or more together, may also find a useful application in other types of arrangements differing from the type described above.

While the invention has been described and illustrated as embodied in an X-ray film cassette loading and unloading arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In an arrangement for handling, especially unloading and loading, cassettes, particularly X-ray cassettes, a combination comprising means for defining a channel for receiving the respective cassette, having an inlet opening extending along a plane; means for transporting the respective cassette along said plane and through said inlet opening into and out of said channel, including a plurality of transporting elements situated in said channel and movable in two opposite transporting directions, and means for driving said transporting elements; means for light-tightly closing said inlet opening at least when the respective cassette is fully received in said channel; and means for controlling the operation of said driving means, including a switching member formed as a rotatable switching roller which is arranged immediately near said inlet opening parallel to said plane substantially over the entire width of said inlet opening as considered in said plane and mounted for movement between an extended position assumed when said channel is empty, and a retracted position assumed when a single cassette enters said channel or leaves said channel through said inlet opening, and means for switching said driving means between a deenergized and an energized state thereof in response to the movement of said switching roller from said extended to said retracted position thereof so that when a cassette enters said channel through said inlet opening said driving means is switched by said switching roller to the energized state to move said transporting elements in one transporting direction and to thereby transport the cassette into said channel, whereas after said driving means has been switched to move said transporting elements in the other opposite direction and to thereby transport the cassette out of said channel and after the cassette leaves said channel through said inlet opening said switching roller switches said driving means to the deenergized state and said transporting elements stop moving in the opposite direction.

2. The combination as defined in claim 1, wherein said switching roller has an axis and two axially spaced ends, said controlling means further including spring elements supporting said ends of said switching roller and urging the same to move toward said extended position thereof, and brackets confining said ends of said switching roller and guiding said ends for movement only toward said spring elements, said spring elements cooperating with said switching means to achieve said switching of said driving means.

3. The combination as defined in claim 2, wherein said switching means includes at least one light barrier; and wherein at least one of said spring elements activates said light barrier in said retracted position of said switching roller.

4. The combination as defined in claim 1, wherein said defining means includes an abutment situated at that end of said channel which is remote from said inlet opening; and wherein said controlling means further includes a switch connected to said driving means and operative for de-energizing the same after being operated by the respective cassette approaching said abutment.

5. The combination as defined in claim 1, wherein said controlling means further includes a switching element responsive to the closing of the respective cassette after the termination of the handling operation, said switching element being connected to said driving means and operative for energizing the same for operation in the discharging direction.

6. The combination as defined in claim 1, wherein said controlling means includes means for reversing the sense of operation of said transporting elements at the latest simultaneously with each energization of said driving means.

7. The combination as defined in claim 1, wherein said controlling means includes delay means operative for delaying at least the de-energization of said driving means.

8. The combination as defined in claim 1, wherein said transporting elements are transport rollers rotatable about respective axes substantially parallel to the axis of said switching roller.

9. The combination as defined in claim 1, wherein said light-tightly closing means includes a slide mounted at said inlet opening for movement across the latter.

10. The combination as defined in claim 1, wherein said transporting elements include a first transporting element which is closest to said inlet opening, said switching roller being located between said inlet opening and said first transporting element.

* * * * *